US011182186B2

United States Patent
Asaro et al.

(10) Patent No.: US 11,182,186 B2
(45) Date of Patent: Nov. 23, 2021

(54) HANG DETECTION FOR VIRTUALIZED ACCELERATED PROCESSING DEVICE

(71) Applicants: Advanced Micro Devices, Inc., Sunnyvale, CA (US); ATI Technologies ULC, Markham (CA)

(72) Inventors: Anthony Asaro, Markham (CA); Yinan Jiang, Markham (CA); Andy Sung, Markham (CA); Ahmed M. Abdelkhalek, Markham (CA); Xiaowei Wang, Shanghai (CN); Sidney D. Fortes, Orlando, FL (US)

(73) Assignees: Advanced Micro Devices, Inc., Sunnyvale, CA (US); ATI Technologies ULC, Markham (CA)

( * ) Notice: Subject to any disclaimer, the term of this patent is extended or adjusted under 35 U.S.C. 154(b) by 146 days.

(21) Appl. No.: 15/663,499

(22) Filed: Jul. 28, 2017

(65) Prior Publication Data

US 2019/0018699 A1 Jan. 17, 2019

(30) Foreign Application Priority Data

Jul. 12, 2017 (CN) ......................... 201710567201.3

(51) Int. Cl.

| | |
|---|---|
| ***G06F 9/46*** | (2006.01) |
| ***G06F 9/455*** | (2018.01) |
| ***G06F 9/48*** | (2006.01) |

(52) U.S. Cl.

CPC ........ *G06F 9/45558* (2013.01); *G06F 9/4812* (2013.01); *G06F 2009/45562* (2013.01); *G06F 2009/45575* (2013.01); *G06F 2009/45579* (2013.01)

(58) Field of Classification Search

CPC ............... G06F 9/45558; G06F 9/4812; G06F 2009/45562; G06F 2009/45575; G06F 2009/45579

See application file for complete search history.

(56) References Cited

U.S. PATENT DOCUMENTS

| | | | | |
|---|---|---|---|---|
| 8,341,624 B1 * | 12/2012 | Hobbs | H04N 21/2662 | 718/1 |
| 2008/0162980 A1 * | 7/2008 | Dahan | G06F 13/1694 | 713/601 |
| 2010/0077394 A1 * | 3/2010 | Wang | G06F 9/45533 | 718/1 |

(Continued)

*Primary Examiner* — Camquy Truong

(74) *Attorney, Agent, or Firm* — Volpe Koenig

(57) ABSTRACT

A technique for recovering from a hang in a virtualized accelerated processing device ("APD") is provided. In the virtualization scheme, different virtual machines are assigned different "time-slices" in which to use the APD. When a time-slice expires, the APD stops operations for a current VM and starts operations for another VM. To stop operations on the APD, a virtualization scheduler sends a request to idle the APD. The APD responds by completing work and idling. If one or more portions of the APD do not complete this idling process before a timeout expires, then a hang occurs. In response to the hang, the virtualization scheduler informs the hypervisor that a hang has occurred. The hypervisor performs a function level reset on the APD and informs the VM that the hang has occurred. The VM responds by stopping command issue to the APD and re-initializing the APD for the function.

18 Claims, 5 Drawing Sheets

(56) References Cited

U.S. PATENT DOCUMENTS

2014/0359267 A1* 12/2014 Moriki ................ G06F 9/45533
713/2
2015/0263776 A1* 9/2015 Shyu .................... A45C 13/002
455/575.8
2015/0293774 A1* 10/2015 Persson ............... G06F 9/45558
718/1
2015/0293775 A1* 10/2015 Persson ............... G06F 9/45558
718/1
2015/0293776 A1* 10/2015 Persson ............... G06F 9/45558
718/1
2017/0123684 A1* 5/2017 Albot .................... G06F 3/0611

* cited by examiner

HANG DETECTION FOR VIRTUALIZED ACCELERATED PROCESSING DEVICE

CROSS REFERENCE TO RELATED APPLICATION

This application claims priority to Chinese Patent Application No. 201710567201.3, filed Jul. 12, 2017, the entire contents of which is hereby incorporated by reference as if fully set forth herein.

BACKGROUND

Computer virtualization is a technique in which a single set of hardware is shared among different virtual instances of a computer system. Each instance—a virtual machine ("VM")—"believes" that it owns a whole, hardware computer system, but in reality, the hardware resources of a computer system are shared among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for recovering from a hang in a virtualized accelerated processing device ("APD") is provided. In the virtualization scheme implemented on the APD, different virtual machines are assigned different "time-slices" in which to use the APD. When a time-slice expires, the APD stops operations for a current virtual machine ("VM") and starts operations for another VM. To stop operations on the APD, a virtualization scheduler sends a request to idle the APD. The APD responds by completing work and idling. If one or more portions of the APD do not complete this idling process before a timeout expires, then a hang occurs. In response to the hang, the virtualization scheduler informs the hypervisor that a hang has occurred. The hypervisor performs a virtual function-function level reset on the APD and informs the VM that the hang has occurred. The VM responds by stopping command issue to the APD and re-initializing the APD for the function after the virtual function-function level reset completes.

Figure 1:
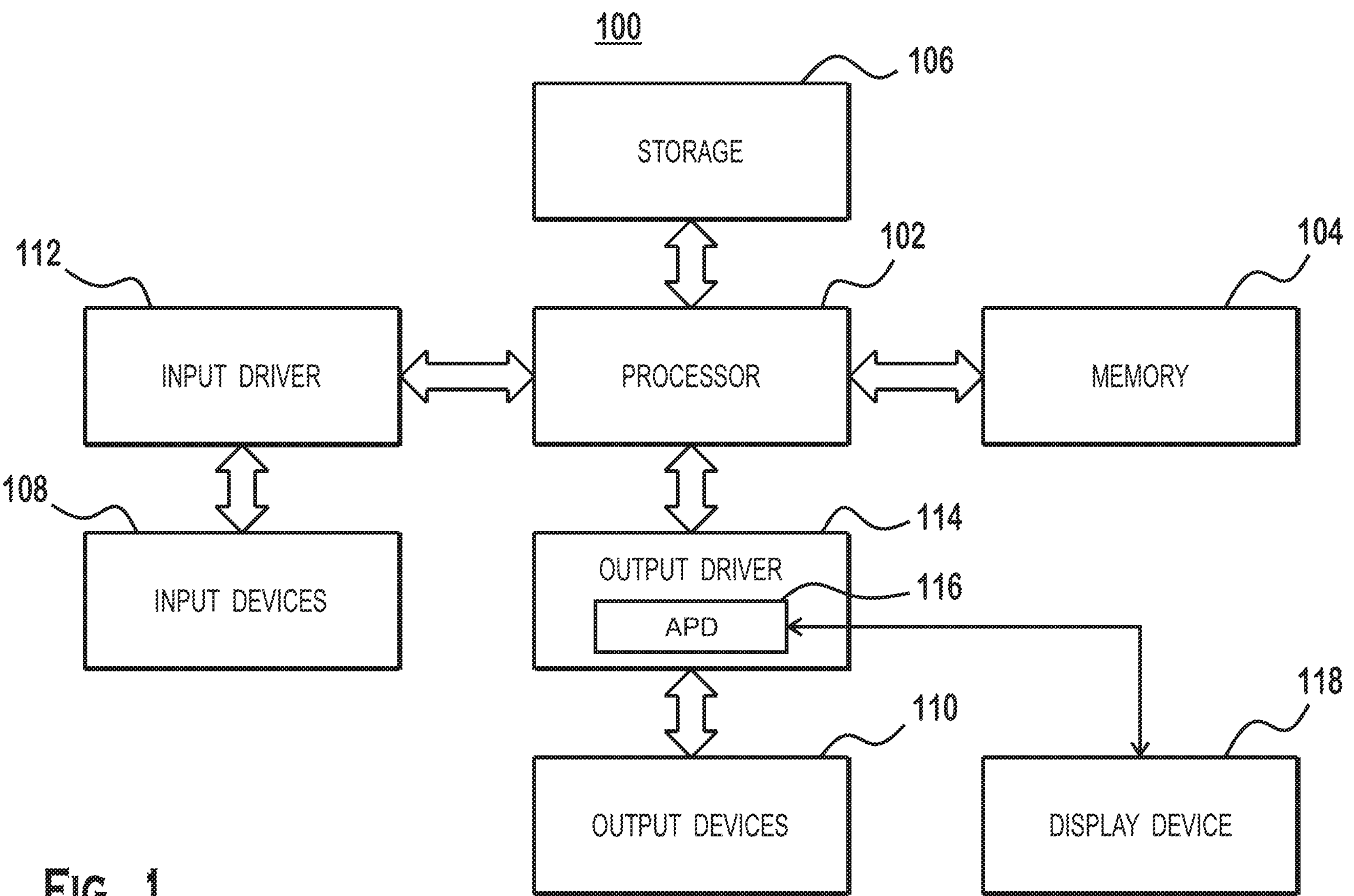
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device

100 includes a processor 102 (which may also be referred to as a "host processor"), a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The input driver 112 and output driver 114 are implemented fully in hardware, fully in software executing on programmable hardware, or as a combination of hardware and software. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. In various examples, the display device 118 is a physical device or a simulated device used in conjunction with a remote protocol to provide display over a network connection. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116.

Figure 2:
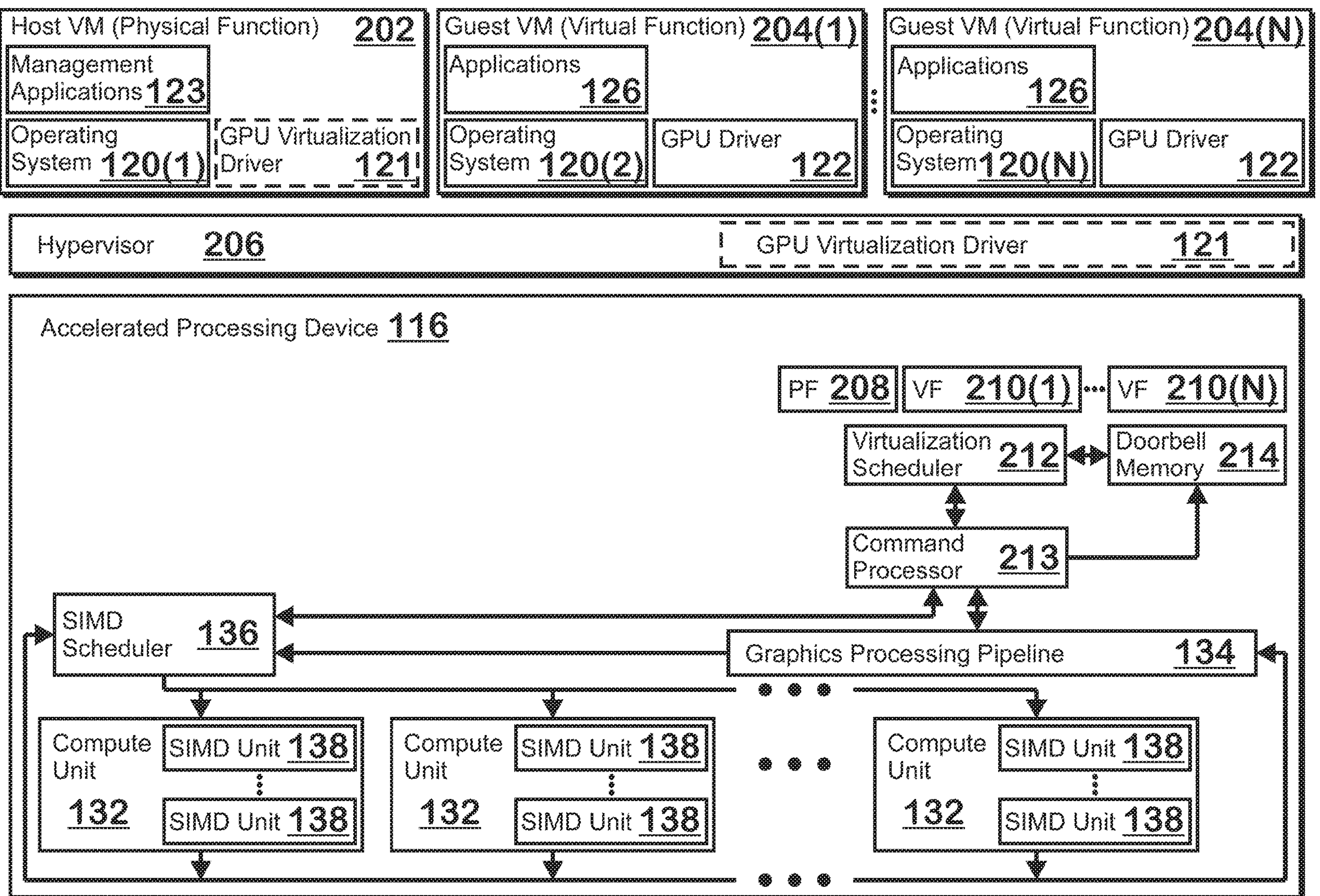
FIG. 2 illustrates details of the device and the accelerated processing device related to virtualization, according to an example.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based sharing of the APD 116 between the virtual machines. On the APD 116, the host VM 202 is mapped to a physical function 208 and guest VMs 204 are mapped to virtual functions 210. "Physical functions" are essentially an addressing parameter in the peripheral component interconnect express ("PCIe") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also acts as an addressing parameter in the PCIe standard. Typically, a set of virtual functions is associated with a particular physical function. Each virtual machine is assigned a different virtual function, with the hypervisor 206 managing the correlation between VMs 204 and virtual functions. This correlation between virtual functions and virtual machines 204 is mostly true in the system of FIG. 2, except that the host VM 202 is able to access the physical function 208 as well as any of the different virtual functions 210. In that sense, the host VM 202 acts as a sort of "master virtual machine" for APD virtualization. In some systems, the host VM 202 is not present, with the functions of the host VM 202 described herein performed by the hypervisor 206 instead (which is why the GPU virtualization driver 121 is illustrated in dotted lines in the hypervisor 206).

As described above, physical functions and virtual functions are addressing parameters in PCIe, where transactions made across PCIe specify or are intended for a particular virtual function and/or physical function and the processor 102 or APD 116 responds accordingly (note, some ways of addressing over PCIe do not explicitly specify a virtual function or physical function; for example, transactions over PCIe can be routed by memory address instead of explicitly by function, where the devices implicitly understand which function is associated with a particular memory address). The processor 102 directs transactions for a particular VM to the appropriate virtual function of the APD 116 via a memory mapping mechanism. More specifically, when a virtual machine makes an access to the APD 116, the memory address used to make that access is translated from a guest physical address to a system physical address. The particular system physical address used is mapped to a particular virtual function of the APD 116 by a memory mapping mechanism and thus the transaction made is routed to the APD 116 and appropriate virtual function via the mapping information.

Sharing the APD 116 among the different virtual machines is accomplished by time-dividing the operations of the APD 116 among the different virtual machines. A virtualization scheduler 212 performs this task, scheduling a new virtual machine for operation by switching from work for a current virtual machine as the execution time assigned to that virtual machine elapses. Although the APD 116 is shared among the different virtual machines, each virtual machine perceives that it has an individual instance of a real, hardware APD 116. Although the terms "virtual function" and "physical function" refer to addressing parameters of the PCIe standard, because these functions map to different VMs, the logical instance of an APD 116 assigned to a particular virtual machine will also be referred to herein as either a virtual function or a physical function. In other words, this disclosure may use terminology such as "the virtual function performs a task," (or physical function) or "an operation is performed on or for a virtual function," (or physical function) and this terminology should be read to mean that the APD 116 performs that task for the time slice assigned to the VM associated with that particular virtual or physical function, or on behalf of the VM associated with that virtual or physical function.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 123 and a GPU virtualization driver 121. In various implementations, the GPU virtualization driver 121 is a traditional graphics driver that also includes functionality to configure aspects of the APD 116 for virtualization. In other implementations, the GPU virtualization driver 121 is separate from a graphics driver and is thus not a traditional graphics driver that communicates with and sends graphics rendering (or other) commands to the APD 116. Instead, the GPU virtualization driver 121 communicates with the APD 116 to configure various aspects of the APD 116 for virtualization. In one example, the GPU virtualization driver 121 manages parameters related to the time-slicing mechanism for sharing the APD 116 among the different VMs, controlling parameters such as how much time is in each time slice, how switching is performed between different virtual functions, and other aspects. The management applications 123 perform one or more tasks for managing virtualization and/or that involve data from two or more different guest VMs 204. In one example, the host VM 202 performs a desktop compositing function through a management application 123, where the desktop compositing function has access to rendered frames from the different guest VMs 204 and composites those frames into a single output view.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or slightly modified version of a device driver for a GPU that would exist in a bare-bones non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. The driver 122 also includes a just-in-time compiler that compiles programs for execution by processing components (such as the SIMD units 138 discussed in further detail below) of the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism, using the doorbell memory 214.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The virtualization scheduler 212 manages time-sharing of the APD 116 among the different virtual machines. In each time slice, the virtualization scheduler 212 permits work for the virtual machine associated with that time slice to proceed in the APD 116. The doorbell memory 214 stores doorbells, which are indications that work is ready to be performed on the APD 116 for a particular virtual machine. The doorbell mechanism operates asynchronously with respect to which virtual machine is currently scheduled for work on the APD 116. This means that a particular virtual machine may place a doorbell in doorbell memory 214 at a time when tasks for a VM other than the VM that placed the doorbell in the doorbell memory 214 are being executed on the APD 116.

Virtualization on the APD 116 works as follows. The virtualization scheduler 212 manages time slices on the APD 116 for the VMs (both the host VM 202 and the guest VMS 204) that share the APD 116. The virtualization scheduler 212 tracks the time slices, stopping work on the APD 116 when a time slice for a particular VM has expired and starting work for the VM having the next time slice. Thus, the virtualization scheduler 212 switches between different VMs that have work to be executed on the APD 116.

To begin work for a particular time slice associated with a particular VM, the virtualization scheduler 212 causes the command processor 213 to fetch commands for the graphics processing pipeline 134 and/or for general purpose computing work from the address specified by the doorbell memory 214 for the particular VM. The command processor 213 then causes the APD 116 to execute those commands. Note that the other portions of the APD 116 whose functionality is not specifically described in the context of virtualization works as described above and as if no virtualization was occurring to execute the commands fetched by the command processor 213. For example, the graphics processing pipeline 134 performs operations related to graphics rendering in response to graphics rendering commands fetched by the command processor 213. For at least some of the graphics rendering commands associated with the graphics processing pipeline 134, and/or for the general purpose compute operation, SIMD scheduler 136 generates and manages wavefronts for execution on the SIMD units 138 of the compute units 132 in accordance with the commands processed by the command processor 213. In an example a command is a command to render a particular piece of geometry using, among other facilities of the graphics processing pipeline 134, a particular pixel shader program. The graphics processing pipeline 134 processes the geometry through the various stages of the graphics processing pipeline 134, such as the input assembler stage 302, hull shader stage 306, tessellator stage 308, and so on, and at the pixel shader stage 316, causes the geometry to be processed with a specific pixel shader, on the SIMD units 138. The SIMD scheduler 136, manages and schedules the wavefronts for the pixel shader for execution.

Figure 3:
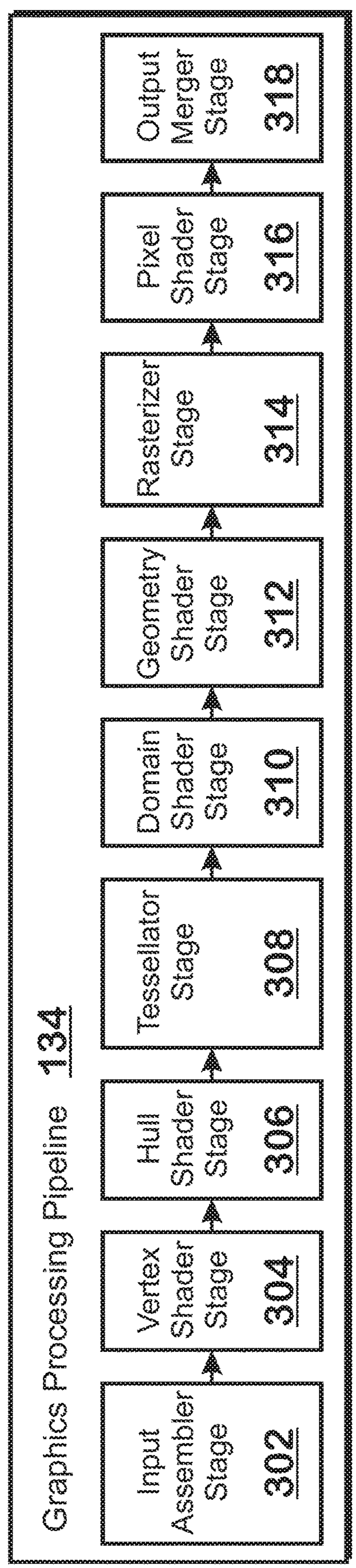
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Referring back to FIG. 2, when the virtualization scheduler 212 determines that the time slice for the VM having work currently executing on the APD 116 has expired, the virtualization schedulers causes the APD 116 to complete that work without accepting any new work (e.g., does not accept new tasks pointed to by a doorbell stored in the doorbell memory 214 but completes the tasks already "in flight" in the graphics processing pipeline 134 and/or compute units 138). Completing the tasks involves allowing the work currently in-flight in the APD 116 to complete and to have final output values written out to the target memory location. For example, for graphics rendering, output pixels would be written to the frame buffer (or other render target). (Note, stalls may occur in which work currently executing in the APD 116 either does not complete or takes an exceedingly long time to complete). Alternatively, instead of completing tasks, state for the tasks may be saved and restored again when the function/VM again gets a "turn" on the APD 116. The virtualization scheduler 212, GPU virtualization driver 121, management applications 123 in the host VM 202, and/or another entity may work independently or cooperate to handle stalls.

After work has completed for a particular VM, the virtualization scheduler 212 moves on to the time slice for the next VM, causing the command processor 213 to fetch tasks for that VM based on the contents of the doorbell memory 214, and to execute those tasks on the graphics processing pipeline 134 and/or in the compute units 132 directly (e.g., for general purpose computing). This process of stopping execution of work for a time slice that has expired and starting work for the next VM continues to provide time-sharing of the APD 116 to the different VMs.

The change between execution of work for one VM and execution of work for another VM is referred to as a "virtualization context switch" herein. In addition to stopping work for one VM and starting work for another VM, a virtualization context switch also involves saving state for the VM that is being switched away from and loading state for the VM that is being switched to. Generally, state includes values stored throughout or for the APD 116 that manage aspects of the workflow executed for the APD 116. In various examples, state may include values stored in registers that control how graphics is rendered, how SIMD work is executed, how shaders are executed, and control various other aspects of operations on the APD 116. Saving state involves writing the state from an in-use location (where the state values actually have effect on the operation of the APD 116) to a save state location for the VM. Loading state involves loading the state from the save state location for the VM to the in-use location.

As described above, when a time-slice for a particular function expires, the APD 116 performs a virtualization context switch in which the APD 116 switches from performing work for the current function to performing work for a subsequent function. Many tasks are involved in this switch, and one task includes stopping work for the current function and starting work for the subsequent function. The stopping of work involves preventing new commands from being fetched/issued by the command processor 213, allowing work already dispatched for the current function to finish in the APD 116, saving state for the current function, loading state for the subsequent function, and causing the command processor 213 to execute commands for the subsequent function on the APD 116. The virtualization scheduler 212 is the entity that requests that work be stopped in the APD 116.

Allowing work already dispatched for the current function to finish in the APD 116 includes transmitting an "idle" command to the APD 116, which is a request for the APD 116 to complete outstanding work and then stop further processing when appropriate. For graphics work, an "appropriate" time to stop is at the boundary between draw calls. More specifically, one way in which graphics rendering work is performed in the APD 116 is for a VM to request objects to be rendered via "draw calls," where each draw call specifies some geometry to be rendered. One "appropriate" time to stop is after work for one draw call is completed in the graphics processing pipeline 134 and before work for a subsequent draw call is begun in the graphics processing pipeline 134. Other points at which work is stopped may alternative be used. For example, for general purpose compute work, work may stop when a particular instance (e.g., workgroup) of a compute shader has finished executing. Note that in some instances, issuing an idle command is unnecessary, as if the APD 116 finishes work early (before the end of a time-slice), the APD 116 informs the virtualization scheduler 212 that the APD 116 is idle.

In some instances, the request from the virtualization scheduler 212 to stop work in the APD 116 (the "idle" command) for the current function results in a hang. More specifically, the request from the APD 116 to stop work is a sort of "soft" command in that the request is obeyed eventually, but not until a certain set of in-flight work is deemed to be completed or at least saved for later completion. This fact means that there is some delay between the stop-work request being issued and the APD 116 actually stopping work. In some situations, this delay is very long. If the delay is longer than a timeout threshold, then the APD 116 is deemed to be "hung."

Figure 4:
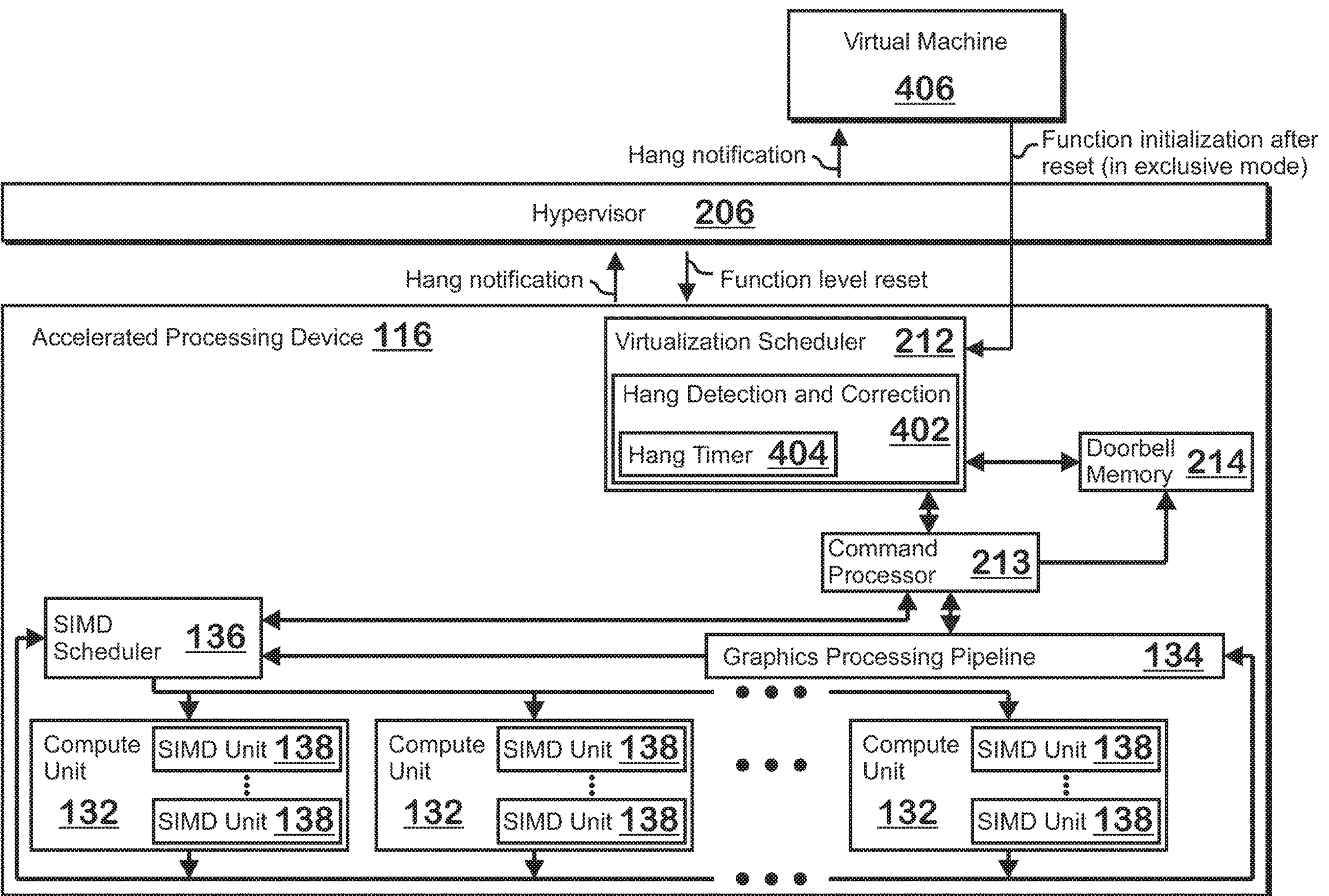
FIG. 4 is a block diagram illustrating features of the device of FIG. 1 related to hang detection and correction, according to an example.

FIG. 4 is a block diagram illustrating features of the device 100 related to hang detection and correction, according to an example. Many of the elements of the device 100 are illustrated in FIG. 4, which also illustrates a hang detection and correction unit 402 and a hang timer 404, both illustrated as being included within the virtualization scheduler 212. The hang detection and correction unit 402 and hang timer 404 may be implemented in hardware, software, or with any combination thereof.

The hang detection and correction unit 402 of the virtualization scheduler 212 checks for hangs during virtualization context switches and performs corrective action in response to detecting such a hang. Detecting the hang is done using a hang timer 404. More specifically, in conjunction with requesting that work be stopped on the APD 116, the hang detection and correction unit 402 begins a countdown on a hang timer 404. If the hang timer 404 indicates that a particular threshold amount of time has elapsed and the APD 116 has not yet confirmed that work has in fact stopped in the APD 116, then the hang detection and correction unit 402 deems a hang to have occurred. If the hang detection and correction unit 402 detects that work has completed in the APD 116 as requested before the hang timer 404 reaches the threshold time value, then a hang is deemed to not have occurred, and the virtualization scheduler 212 proceeds normally, causing work to be performed for the subsequent function.

In the event that the hang detection and correction unit 402 does detect a hang, the hang detection and correction unit 402 causes several events to occur to respond to the hang. More specifically, the hang detection and correction unit 402 notifies the hypervisor 206, via an interrupt signal, that a hang has occurred for a particular function. This interrupt signal causes the hypervisor 206 to interrupt other operations on the processor 102 and to execute a handler associated with virtualization context switch hangs on the APD 116. The handler issues a virtual function-function level reset ("VF FLR") request to the APD 116 and also informs the VM associated with the hung function that the reset occurred.

In response to receiving the virtual function-function level reset request, the APD 116 performs a virtual function-function level reset for the hung function. Generally, the virtual function-function level reset sets the state of the specified virtual function back to a pre-initialization state so that the work being performed for that virtual function is stopped and so that the corresponding virtual machine can again initialize that virtual function. Among other things, the virtual function-function level reset interrupts the in flight work in the APD 116, and also includes clearing state and data for the virtual function in the APD 116, so that the function can be re-initialized. Examples of the state that is cleared include state saved during virtualization context switches, pointers into command buffers, instruction pointers for the SIMD units 138, and other state involved with APD 116 execution.

In response to the VM being informed by the hypervisor 206 that the reset occurred for the APD 116, the VM stops issuing commands to the APD 116. Additionally, the VM re-initializes the virtual function that was reset. This initialization involves requesting and obtaining exclusive access to the APD 116 from the hypervisor 206, where exclusive access means that the VM is able to directly access features of the APD 116 such as registers, and the like. With exclusive access, the VM sets the values for various registers and performs other initialization functions. After completion of initialization, the VM gives up exclusive access to the APD 116.

Figure 5:
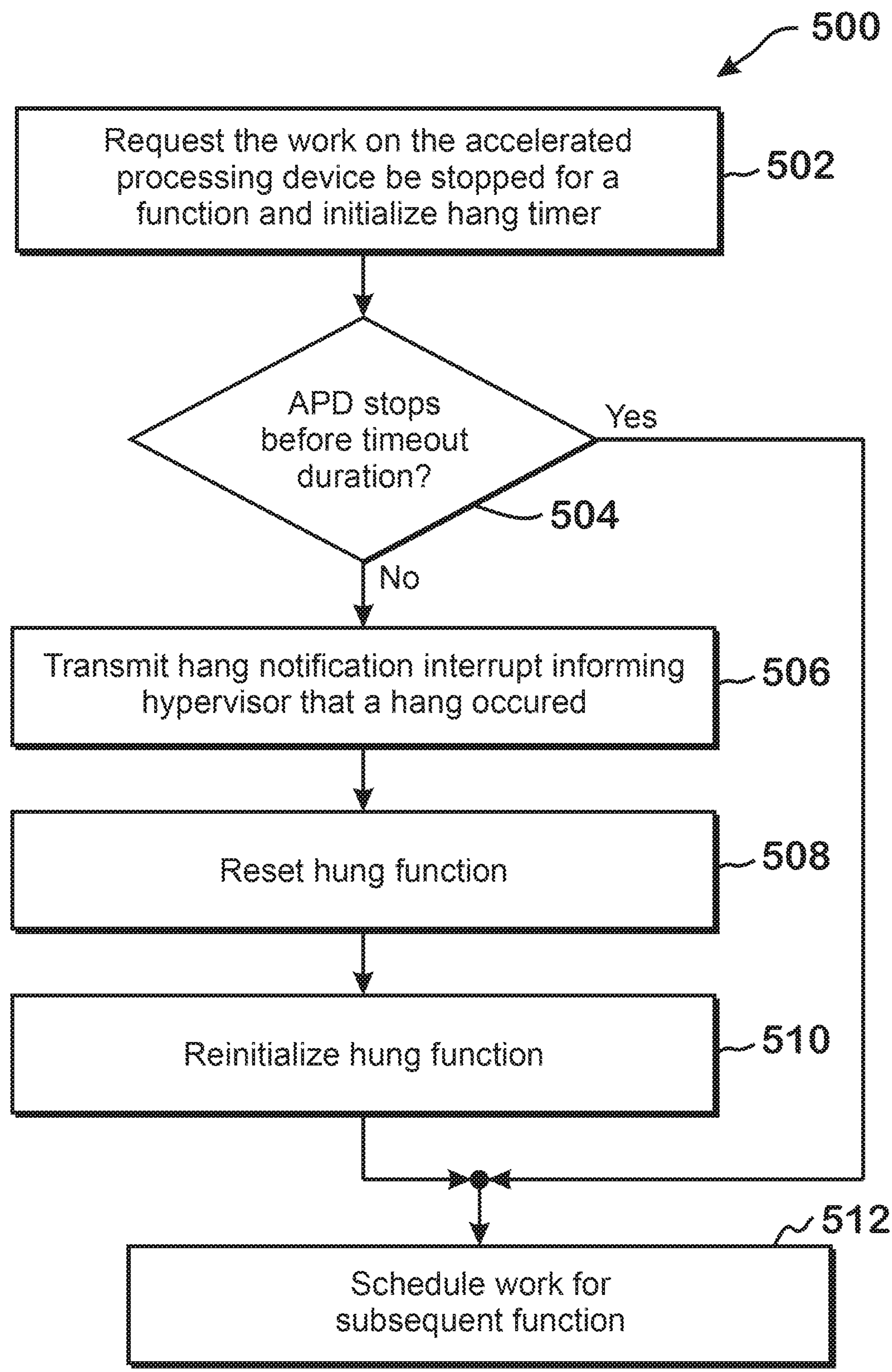
FIG. 5 is a flow diagram of a method for detecting a hang for a function on the accelerated processing device and responding to that hang, according to an example.

FIG. 5 is a flow diagram of a method for detecting a hang for a function on the APD 116 and responding to that hang, according to an example. Although the operations of FIG. 5 are described with respect to the system of FIGS. 1-4, it should be understood the method 500, performed by any system, with steps as illustrated or in any other technically feasible order, falls within the scope of the present disclosure.

As shown, the method 500 begins at step 502, where the virtualization scheduler 212 determines that a time slice for the current function has expired and thus requests the APD 116 to stop work for the current function. At step 504, the virtualization scheduler 212 determines whether the APD 116 stops the work as requested before a timeout duration. The timeout duration is a period of time after which, if the APD 116 has not yet stopped work as requested, a hang is deemed to have occurred. If the APD 116 stops work before the timeout duration, then the method 500 proceeds to step 512 and if the APD 116 does not stop work before the timeout duration, then the method 500 proceeds to step 506.

At step 506, the virtualization scheduler 212 transmits a hang notification interrupt to the hypervisor 206 informing the hypervisor 206 that a hang has occurred for the function. The hypervisor 206 forwards this notification to the GPU virtualization driver 121. In response to this notification, the GPU virtualization driver 121 pre-empts execution from other software running on the processor 102 and executes a handler for the virtual function hang. The handler instructs the APD 116 to reset the hung function and notifies the VM associated with the hung function that the function has hung. In response to receiving that instruction, at step 508, the APD 116 resets the hung function.

In response to receiving at the VM, the notification from the GPU virtualization driver 121 that the function is hung, the GPU driver of that VM stops issuing commands to the APD 116 for the hung function and, when the APD 116 has been reset, re-initializes the function for that VM at step 510. Reinitialization includes cleaning driver software state, reprogramming engine (i.e., APD 116) settings, and notifying the GPU virtualization driver 121 that re-initialization has completed. After step 510, the method 500 proceeds to step 512—the APD 116 performs work for another function.

It should be understood that many variations are possible based on the disclosure herein. For example, although PCIe has been described herein as a particular interconnect fabric, any other technically feasible interconnect fabric may be alternatively used. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for recovering from a hang in a virtualized accelerated processing device ("APD"), the method comprising:

after a first draw call has ended and before a second draw call has begun, issuing, by a virtualization scheduler that is external to a hypervisor configured to support a first virtual machine associated with a current function, a first request to stop operations on the APD for the current function of the APD;

determining, by the virtualization scheduler, that operations of the APD have not stopped after a timeout period has elapsed since issuing the first request to stop;

responsive to the determining, issuing a first hang interrupt signal to the hypervisor;

receiving, from a handler, an instruction to reset the current function, wherein the hypervisor forwards the first hang interrupt signal to a virtualization driver, wherein the handler is executed by the virtualization driver in response to receiving the first hang interrupt signal; and in response to the instruction to reset the current function, resetting, by the APD, the current function.

2. The method of claim 1, further comprising:

after resetting the APD for the current function, initializing the current function at the direction of the first virtual machine.

3. The method of claim 1, wherein:

issuing the first request to stop operations on the APD for the current function is performed in response to determining that a virtualization context switch is to occur.

4. The method of claim 3, wherein determining that the virtualization context switch is to occur comprises determining that a time-slice assigned to the current function has elapsed.

5. The method of claim 1, wherein:

the first request to stop operations on the APD for the current function comprises a request to complete work for the current function and to idle processing elements of the APD after the work is completed.

6. The method of claim 1, wherein resetting the APD for the current function comprises:

placing the current function into a state in which the current function is ready to be initialized.

7. The method of claim 6, wherein resetting the APD for the current function further comprises:

forcing operations for the current function on the APD to stop, and clearing state for the current function.

8. The method of claim 1, further comprising:

responsive to receiving the first hang interrupt signal, issuing, by the hypervisor, a hang notification to the first virtual machine.

9. The method of claim 8, further comprising:

stopping issuing commands to the APD, by the first virtual machine, responsive to receiving the hang notification.

10. A device, comprising:

a processor configured to execute a plurality of virtual machines and a hypervisor configured to support a first virtual machine of the plurality of virtual machines associated with a current function; and a virtualized accelerated processing device ("APD") in communication with the processor, the virtualized APD configured to:

support one or more functions, the functions corresponding to different virtual machines of the plurality of virtual machines executed on the processor;

after a first draw call has ended and before a second draw call has begun, issue, by a virtualization scheduler of the APD, a first request to stop operations on the APD for the current function of the APD;

determine, by the virtualization scheduler, that operations of the APD have not stopped after a timeout period has elapsed since issuing the first request to stop; and responsive to the determining, issue a first hang interrupt signal to the hypervisor;

receive, from a handler, an instruction to reset the current function, wherein the hypervisor forwards the first hang interrupt signal to a virtualization driver, wherein the handler is executed by the virtualization driver in response to receiving the first hang interrupt signal; and in response to the instruction to reset the current function, reset, by the APD, the current function.

11. The device of claim 10, wherein the APD is further configured to:

initialize the current function at the direction of the first virtual machine after resetting the APD for the current function.

12. The device of claim 10, wherein:

the APD is configured to issue the first request to stop operations on the APD for the current function in response to determining that a virtualization context switch is to occur.

13. The device of claim 12, wherein:

the APD is configured to determine that the virtualization context switch is to occur by determining that a time-slice assigned to the current function has elapsed.

14. The device of claim 10, wherein:

the first request to stop operations on the APD for the current function comprises a request to complete work for the current function and to idle processing elements of the APD after the work is completed.

15. The device of claim 10, wherein the APD is configured to reset the APD for the current function by:

placing the current function into a state in which the current function is ready to be initialized.

16. The device of claim 15, wherein the APD is further configured to reset the APD for the current function by:

forcing operations for the current function on the APD to stop, and clearing state for the current function.

17. The device of claim 10, wherein:

the processor is configured to execute the hypervisor that is configured to, responsive to receiving the first hang interrupt signal, issue a hang notification to the first virtual machine.

18. The device of claim 17, wherein the first virtual machine is further configured to:

stop issuing commands to the APD responsive to receiving the hang notification.

* * * * *